United States Patent
Lamontagne

(10) Patent No.: US 7,747,417 B2
(45) Date of Patent: Jun. 29, 2010

(54) METHOD AND SYSTEM FOR TRANSFORMER DISSOLVED GAS HARMONIC REGRESSION ANALYSIS

(75) Inventor: Donald R. Lamontagne, Avondale, AZ (US)

(73) Assignee: Arizona Public Service Company, Phoenix, AZ (US)

( * ) Notice: Subject to any disclaimer, the term of this patent is extended or adjusted under 35 U.S.C. 154(b) by 358 days.

(21) Appl. No.: 11/834,500

(22) Filed: Aug. 6, 2007

(65) Prior Publication Data

US 2009/0043538 A1 Feb. 12, 2009

(51) Int. Cl.
*G06F 11/00* (2006.01)
(52) U.S. Cl. ...................................... 702/188
(58) Field of Classification Search .................. 702/25, 702/32, 34, 35, 50, 55, 56, 58, 66, 67, 69–71, 702/79, 90, 104, 179, 182, 184, 185, 188, 702/189, 190; 700/292; 73/19.12, 53.01
See application file for complete search history.

(56) References Cited

U.S. PATENT DOCUMENTS

| | | | |
|---|---|---|---|
| 2,883,255 A | | 4/1959 | Anderson |
| 3,304,441 A | | 2/1967 | Pelt |
| 4,654,806 A | * | 3/1987 | Poyser et al. ............... 700/292 |
| 4,799,166 A | * | 1/1989 | Shiono et al. ............... 702/25 |
| 5,959,529 A | | 9/1999 | Kail, IV |
| 6,225,901 B1 | | 5/2001 | Kail, IV |
| 6,391,096 B1 | | 5/2002 | Waters et al. |
| 6,446,027 B1 | | 9/2002 | O'Keeffe et al. |
| 6,526,805 B1 | * | 3/2003 | Babes-Dornea et al. .... 73/19.12 |
| 6,906,630 B2 | | 6/2005 | Georges et al. |
| 6,928,861 B1 | | 8/2005 | Rice |
| 6,940,403 B2 | | 9/2005 | Kail, IV |
| 7,222,518 B2 | * | 5/2007 | Dohi et al. ................. 73/53.01 |
| 7,399,277 B2 | | 7/2008 | Saidara et al. |
| 2002/0161558 A1 | * | 10/2002 | Georges et al. ............ 702/189 |
| 2003/0115019 A1 | | 6/2003 | Doddek et al. |
| 2003/0122677 A1 | | 7/2003 | Kail, IV |

(Continued)

OTHER PUBLICATIONS

D.R. Lamontagne, An Artifical Neural Network Approach to Transformer Dissolved Gas Analysis and Problem Notification at Arizona Public Service, EPRI Substation Equipment Diagnostics Conference XIV, Jul. 2006.

(Continued)

*Primary Examiner*—Mohamed Charioui
(74) *Attorney, Agent, or Firm*—Meschkow & Gresham, P.L.C.

(57) ABSTRACT

A transformer (26) is monitored by a dissolved gas monitoring device (28). A method (36) in the form of executable code instructs a processor (34) to analyze a condition of the transformer (26). The method includes receiving (90), from the monitoring device (28), data elements (60) in the form of values (70) of dissolved gases (72) associated with operation of transformer (26) during a period of time. Periodic characteristics responsive to the operation of the transformer (26) are identified (92) from the data elements (60). The periodic characteristics may include a daily, semi-annual, and/or annual fluctuation of gas generation in response to transformer loading. A gas generation rate trend (112) is distinguished from the periodic characteristics, the condition of the transformer (26) is determined and its future condition may be predicted in response to the trend (112). The condition is presented to a user (58).

19 Claims, 9 Drawing Sheets

U.S. PATENT DOCUMENTS

2003/0130810 A1* 7/2003 Smulders et al. .............. 702/56
2005/0038332 A1 2/2005 Saidara et al.
2008/0255438 A1 10/2008 Saidara et al.

OTHER PUBLICATIONS

Z. Wang, Artificial Intelligence Applications in the Diagnosis of Power Transformer Incipient Faults, http://scholar.lib.vt. edu/theses/available/etd-08102000-21510032/, Blacksburg, VA, Aug. 8, 2000.

V.G. Arakelian, Effective Diagnostics for Oil-Filled Equipment, IEEE Electrical Insulation Magazine, Nov./ Dec. 2002.

M.K. Pradham and T.S. Ramu, On the Estimation of Elapsed Life of Oil-Immersed Power Transformers, IEEE Transactions on Power Delivery, vol. 20, No. 3, Jul. 2005.

Cigre TF B3-03-1, Guidelines to an Optimised Approach to the Renewal of Existing Air Insulated Substations, Apr. 2006.

E. Keogh, et al., Segmenting Time Series: A Survey and Novel Approach, 2001 IEEE International Conference on Data Mining.

Bob Augenstein, "Outside Experts Monitor Status of Key Transformers", Transmission & Distribution World, May 2003, Primedia Bus. Magazines & Media Inc.

Yann-Chang Huang, "A New Intelligent Approach to Fault Detection of Electric Power Transformers", approx. 2000.

Michel Duval, "A Review of Faults Detectable by Gas-in-Oil Analysis in Transformers", IEEE Electrical Insulation Magazine, May/Jun. 2002, vol. 18, No. 3.

Michel Duval & Alfonso Depablo, "Interpretation of a Gas-in-oil Analysis Using New IEC Publication 60599 and IEC TC 10 Databases", IEEE, Mar./Apr. 2001, vol. 17, No. 2.

Vladimiro Miranda & Adriana Rosa Garcez Castro, "Improving the IEC Table for Transformer Failure Diagnosis with Knowledge Extraction From Neural Networks", IEEE, Oct. 5, vol.

Transformers Committee, "IEEE Guide for the Interpretation of Gases Generated in Oil-Immersed Transformers", Institute of Electrical & Electronics Engineers, Inc., NY, Jul. 1992.

"Mineral Oil-Impregnated Electrical Equipment in Service", Norme Internationale, CEI IEC 60599 2nd Edition 99-03, IEC 1999, Switzerland.

General Electrotechnical Engineering Standards Committee, "The Interpretation of the Analysis of Gases in Transformers and Other Oil-Filled Electrical Equipment in Service" 99.

* cited by examiner

FIG. 2

| TRANSFORMER ID | H$_2$ | O$_2$ | CO | CO$_2$ | CH$_4$ | C$_2$H$_2$ | C$_2$H$_4$ | C$_2$H$_6$ |
|---|---|---|---|---|---|---|---|---|
| TA01 | 10 | 750 | 55 | 400 | 25 | 0 | 2 | 10 |

FIG. 3

| TRANSFORMER ID | H$_2$ | O$_2$ | CO | CO$_2$ | CH$_4$ | C$_2$H$_2$ | C$_2$H$_4$ | C$_2$H$_6$ |
|---|---|---|---|---|---|---|---|---|
| TA01 | 35 | 900 | 310 | 1100 | 6 | 0 | 0 | 0 |

FIG. 4

| TRANSFORMER ID: TA01 | | | | | | | |
|---|---|---|---|---|---|---|---|
| FAULT CONDITION | | | | | SEVERITY LEVEL | | |
| TYPE: OVERHEATING | | | | | 4 | | |
| H$_2$ | O$_2$ | CO | CO$_2$ | CH$_4$ | C$_2$H$_2$ | C$_2$H$_4$ | C$_2$H$_6$ |
| 35 | 900 | 310 | 1100 | 6 | 0 | 0 | 0 |
| TREND DATA | | | | | | | |

FIG. 6

HARMONIC REGRESSION EQUATION:

$Y = C_1 + C_2 t + \beta_1 \sin(\omega_1 t) + \beta_2 \cos(\omega_1 t) + \beta_3 \sin(\omega_2 t) + \beta_4 \cos(\omega_2 t) + \beta_5 \sin(\omega_3 t) + \beta_6 \cos(\omega_3 t)$ WHERE:
- $C_1$ = INTERCEPT VALUE
- $C_2 t$ = COMPONENT THAT IS A FUNCTION OF TIME
- $\omega_1 = 2\pi/6$ PERIODS
- $\omega_2 = 2\pi/1095$ PERIODS
- $\omega_3 = 2\pi/365$ PERIODS, AND t = 1 PERIOD = 4 HOURS (SAMPLE RATE)

EQUATION FOLLOWING CANCELLATION OF PERIODIC CHARACTERISTICS:

$Y = C_2 t + C_1$

WHERE:
$C_2$ = STEADY STATE GAS GENERATION RATE ically, the present invention relates to dissolved gas analysis
METHOD AND SYSTEM FOR TRANSFORMER DISSOLVED GAS HARMONIC REGRESSION ANALYSIS

TECHNICAL FIELD OF THE INVENTION

The present invention relates to the field of transformer management and fault monitoring systems. More specifically, the present invention relates to dissolved gas analysis (DGA) for determination of gas generation rate over a time interval.

BACKGROUND OF THE INVENTION

Electric power transmission is a process in the delivery of electricity to consumers. In general, the term "electric power transmission" refers to the bulk transfer of electrical power from place to place, for example, between a power plant and a substation near a populated area. Due to the large amount of power involved, electric transmission normally takes place at high voltage (100 kV or above). Transformers are used at the substations to step the voltage down to a lower voltage for distribution to commercial and residential users. Other power transfer equipment utilized by the electrical utility industry includes, but is not limited to tap changers, circuit breakers, switches, capacitors, reactors, and the like.

Electric power transfer equipment is frequently filled with a fluid, typically of a mineral oil origin, that generally serves as a dielectric media, an insulator, and a heat transfer agent. During normal use this fluid undergoes a slow degradation to yield gases that collect in the oil. When there is an electrical fault within the transformer, these gases are generated more rapidly. Each of a number of fault conditions possible within a transformer generates certain key gases and a distribution pattern of these gases. Thus, the character of the fault condition giving rise to the gases may be ascertained by determining the various gases present in the transformer fluid and their amounts.

Dissolved gas analysis (DGA) is a widely used predictive maintenance technique for monitoring the collection and rate of generation of theses gases in liquid-filled electric power transfer equipment, in order to gauge the operation of such equipment. On-line dissolved gas analysis systems can provide analysis of multiple gases, for example, hydrogen ($H_2$), oxygen ($O_2$), carbon monoxide (CO), carbon dioxide ($CO_2$), methane ($CH_4$), acetylene ($C_2H_2$), ethylene ($C_2H_4$), and ethane ($C_2H_6$). Samples may be taken periodically, for example, every four hours, from each transformer being monitored. This sample rate desirably increases to, for example, hourly if predefined thresholds for an individual gas, or if a rate of change for an individual gas, is reached. At a utility managing many transformers, this sample rate yields a plethora of data samples, each of which is to be analyzed.

Conventional online dissolved gas analysis systems are based on directly comparing measured quantities to threshold values (constants) and threshold (constants) gas generation rates. While this allows power producers and distributors to ascertain when certain measured quantities fall outside the threshold values, this approach generates false alarms of equipment malfunction. Existing dissolved gas analysis techniques cannot distinguish gas generation rates caused by faults and incipient faults from acceptable gas generation rates caused by periodic loading of the liquid-filled electric power transfer equipment.

SUMMARY OF THE INVENTION

Accordingly, it is an advantage of the present invention that a method and system are provided for analyzing an operating condition of liquid-filled electrical equipment monitored by a monitoring device.

It is another advantage of the present invention that a method and system are provided that can determine a steady state gas generation rate with periodic effects factored out.

Another advantage of the present invention is that a method and system are provided in which accurate predictions of future gas generation rates can be made.

The above and other advantages of the present invention are carried out in one form by a method for analyzing a condition of electrical equipment monitored by a monitoring device. The method calls for receiving, from the monitoring device, data elements associated with operation of the electrical equipment during a period of time and identifying, from the data elements, a periodic characteristic responsive to the operation of the electrical equipment. The method further calls for distinguishing a trend from the periodic characteristic, determining the condition of the electrical equipment in response to the trend, and presenting the condition to a user.

The above and other advantages of the present invention are carried out in another form by a computer-readable storage medium containing executable code for instructing a processor to analyze a condition of a transformer maintained by an organization and monitored by a dissolved gas monitoring device. The executable code instructs the processor to perform operations that include receiving, from the monitoring device, data elements associated with operation of the transformer during a period of time, the data elements including current values of a dissolved gas in a volume of transformer oil in the transformer. A periodic characteristic responsive to the operation of the electrical equipment is identified from the data elements. A trend is distinguished from the periodic characteristic by canceling the periodic characteristic from the data elements over the period of time to reveal the trend. A gas generation rate of the dissolved gas is determined from the trend. The gas generation rate identifies a condition of the transformer, and the condition is presented to a user.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a diagram of a first exemplary packet of data elements produced by a monitoring device monitoring one of the apparatuses of FIG. 1;

FIG. 3 shows a diagram of a second exemplary packet of data elements produced by the monitoring device monitoring one of the apparatuses of FIG. 1;

FIG. 4 shows a diagram of a notice provided to a responsible party of an exception to a normal condition of one of the apparatuses of FIG. 1;

FIG. 6 shows a table of a sample harmonic regression equation utilized within the analysis process;

DETAILED DESCRIPTION OF THE PREFERRED EMBODIMENTS

The present invention entails an analysis method, computer-readable medium containing executable code, and system for analyzing a condition of electrical equipment monitored by monitoring units. The invention is described in connection with monitoring of fault conditions in transformers located at substations of an electric utility company. Monitoring is performed by dissolved gas analysis (DGA) units, one or more of the DGA units performing on-line monitoring of one each of the transformers. Analysis in accordance with the present invention provides an accurate determination of an actual gas generation rate in transformers through the elimination of the periodic effects that transformer loading has on transformer gas generation rate. Results from the analysis can be utilized to determine a condition of a transformer, such that a fault type, severity and/or trend in the gas generation rate can be determined and communicated to a responsible party or parties. It should become readily apparent in the ensuing discussion that the present invention may be readily adapted to a variety of environments in which vast quantities of data are being collected and analyzed, and in which underlying periodic characteristics, or normal cyclic behavior, of the equipment can be distinguished from an abnormal condition.

Figure 1:
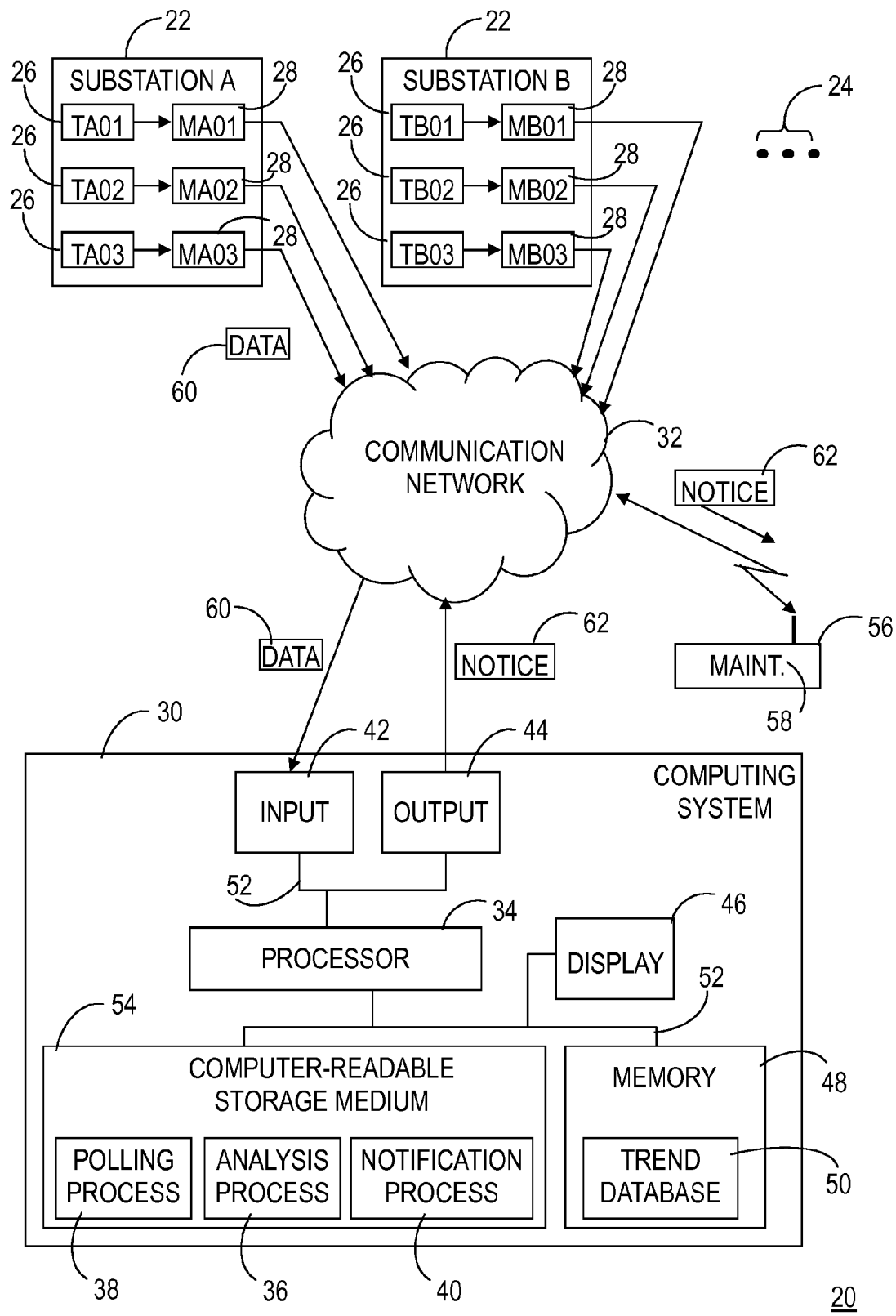
FIG. 1 shows a block diagram of a portion of an facility in which analysis of data elements and notification of fault conditions take place in accordance with the present invention.

FIG. 1 shows a block diagram of a portion of a facility 20 in which analysis of data elements and notification of fault conditions take place in accordance with a preferred embodiment of the present invention. Facility 20 includes a plurality of substations 22, of which only two are shown. Additional substations 22 are represented by ellipsis 24. A plurality of apparatuses, in the form of transformers 26, is located at each of substations 22. Only three transformers 26 are shown at each of substations 22 for simplicity of illustration. However, it should be understood that each of substations 22 can include any number of transformers 26, as known to those skilled in the art.

Each of transformers 26 is monitored by one or more of a plurality of dissolved gas analyzer (DGA) units 28. DGA units 28 monitor transformer fluid, typically of a mineral oil origin. DGA units 28 monitor, for example, eight gases that are a product of the degradation of the mineral oil-based transformer fluid. These eight gases can include hydrogen ($H_2$), oxygen ($O_2$), carbon monoxide ($CO$), carbon dioxide ($CO_2$), methane ($CH_4$), acetylene ($C_2H_2$), ethylene ($C_2H_4$), and ethane ($C_2H_6$).

Facility 20 further includes a computing system 30 in communication with DGA units 28 via a communication network 32. In a preferred embodiment, computing system 30 may be located at an energy control center (not shown) operated by electric utility facility 20. However, processing system 30 may alternatively be outsourced to a contracted third party monitoring facility 20.

Computing system 30 includes a processor 34 for executing an analysis process 36 in accordance with the present invention. Processor 34 may also execute an optional polling process 38 and a notification process 40. Processor 34 is in communication with an input device 42, an output device 44, a display 46, and a memory system 48 for storing a trend database 50 that may be generated in response to the execution of analysis process 36. These elements are interconnected by a bus structure 52. Those skilled in the art will recognize that analysis process 36, polling process 38, and notification process 40 need not be distinct physical units, but may instead be realized as a single, integrated process. The specific configuration of computing system 30 depends, at least in part, on the complexity of facility 20, the number of DGA units 28 providing data to processing system 30, and the amount of data being processed.

Input device 42 can encompass a keyboard, mouse, pointing device, audio device (e.g., a microphone), and/or any other device providing input to processor 34. Output device 44 can encompass a printer, an audio device (e.g., a speaker), and/or other devices providing output from processor 34. Input and output devices 42 and 44 can also include network connections, modems, or other devices used for communications with other computer systems or devices via communication network 32.

Computing system 30 also includes a computer-readable storage medium 54. Computer-readable storage medium 54 may be a magnetic disk, compact disk, or any other volatile or non-volatile mass storage system readable by processor 34. Computer-readable storage medium 54 may also include cooperating or interconnected computer readable media, which exist exclusively on computing system 30 or are distributed among multiple interconnected computer systems (not shown) that may be local or remote. Analysis process 36, polling process 38, and notification process 40 are recorded on computer-readable storage medium 54 for instructing processor 34 to perform polling, analysis, and notification functions, as discussed below.

Facility 20 may also include notification devices 56, of which only one is shown. Notification devices 56 may be conventional handheld communications devices, such as pagers, cellular phones, personal digital assistants, or a combination thereof. Alternatively, notification devices 56 may be desktop computers or any other means for producing an electronic message to the users of notification devices 56. Notification devices 56 may be in communication with computing system 30 via communication network 32. Communication network 32 may communicate via conventional wireless and/or wireline techniques well known to those skilled in the art.

Each of notification devices 56 is assigned to, or associated with, a particular responsible party 58. In this illustration, responsible party 58 may be a maintenance team of one or more individuals that are responsible for transformers 26 at particular substations 22, are most knowledgeable of the corrective measures needed for particular fault conditions, and/or have an appropriate level of authority to make decisions regarding transformers 26.

In general, DGA analyzers 28 sample fluid within transformers 26 and monitor for dissolved gases in the sampled fluid. Samples may nominally be taken every four hours.

However, the sample rate may increase to hourly if predefined thresholds for an individual gas, or if a predefined rate of change for an individual gas, is reached. Dissolved gas monitoring at DGA units 28 entails measurement of values for each of a number of dissolved gases within transformer fluid. These measurements are subsequently communicated as data elements 60 to computing system 30 via communication network 32. Communication of data elements 60 from DGA units 28 may take place automatically and/or in response to a polling signal communicated via polling process 38. Alternatively, data elements 60 can be taken manually. These manual measurements can be manually input into processing system 30 per conventional data entry methodology. Data elements 60 are analyzed by analysis process 36, and the results of the analysis can be recorded in trend database 48 and/or can be provided via notification process 40 to one or more notification devices 56 assigned to one or more responsible parties 58 in the form of a notice 62.

Referring to FIGS. 2 and 3, FIG. 2 shows a diagram of a first exemplary packet 64 of data elements 60 produced by one of DGA units 28 (FIG. 1) monitoring one of transformers 26 (FIG. 1). FIG. 3 shows a diagram of a second exemplary packet 66 of data elements 60 produced by DGA unit 28 monitoring transformer 26. Each of packets 64 and 66 desirably includes a transformer identifier 68, shown herein as "TA01" identifying one of transformers 26. Each of packets 64 and 66 further includes data elements 60 as values 70 for each of a number of gases 72 that are being monitored by DGA unit 28. Additional information, not shown herein, may be included such as time/date collected, other gases 72 not listed therein, and so forth.

First and second packets 64 and 66 are illustrated herein to portray the information that may be provided from DGA units 28 (FIG. 1) to computing system 30 (FIG. 1) for analysis and subsequent selective notification in accordance with the present invention. The particular configuration of data elements 60 and first and second packets 64 and 66, respectively, for transmission can take a variety of forms and transmission can be accomplished via a variety of techniques known to those skilled in the art.

FIG. 2 generally shows first packet 64 representing a normal condition 74 in which transformer 26, identified by "TA01" is behaving normally. Normal condition 74 may be determined when values 70 for each of gases 72 fall within pre-established limits that define normal condition 74, such as a "Condition 1" level. These pre-established limits may be provided in an industry recognized standard such as the IEEE Std C57.104-1991 "IEEE Guide for the Interpretation of Gases Generated in Oil-Immersed Transformers."

In contrast, FIG. 3 generally shows second packet 66 representing an abnormal condition 76, in which transformer 26, identified by "TA01" may be behaving abnormally. Abnormal condition 76 may be determined when some or all values 70 for gases 72 have risen to more critical condition levels. In this example, carbon monoxide (CO) level has risen to a value that is above normal desired limits. Consequently, the term "abnormal condition 76" is utilized herein to refer to a situation as monitored by DGA units 28 (FIG. 1) in which values 70 for gases 72 are not within normal limits.

Unfortunately, it is not distinguishable from the raw data presented in second packet 66 whether some or all values 70 have risen to an amount that is above normal limits due to a fault condition, or if values 70 have risen due to normal cyclic loading of transformer 26 (FIG. 1). Consequently, some or all values 70 that are above normal limits due to cyclic loading can falsely lead to the notification of abnormal condition 76. Data analysis process 36 (FIG. 1) circumvents this problem by distinguishing actual gas generation rate from normal cyclic transformer loading.

FIG. 4 shows a diagram of notice 62 provided to one or more of responsible parties 58 (FIG. 1) of an exception 78 to normal condition 74 (FIG. 2) of one of transformers 26 (FIG. 1). As mentioned briefly above, data elements 60 herein are values 70 for gases 72 sampled at DGA units 28 (FIG. 1). These values 70 for gases 72 are analyzed by analysis process 36 to reveal an exception 78, i.e., the specific abnormal condition, currently being experienced at the one of transformers 26. Notice 62 may be utilized to communicate exception 78.

Notice 62 is illustrated herein to portray the information regarding exception 78 that may be provided via execution of notification process 40 (FIG. 1) to one or more of responsible parties 58 in accordance with the present invention. The particular configuration of notice 62 can take a variety of forms known to those skilled in the art.

Notice 62 includes transformer identifier 68. Notice 62 further communicates exception 78, and may optionally include values 70 for gases 72. In an exemplary scenario, exception 78 may define a fault condition 80 and a severity level 82 at one of transformers 26. Fault condition 80 may further identify a fault type 84. Notice 62 may also include trend data 88 obtained through the execution of analysis process 36, discussed below, of gas generation rates for one or more of gases 72. Thus, in its entirety, notice 62 can provide responsible parties 58 with a high level of detail regarding an abnormality within one of transformers 26.

Figure 5:
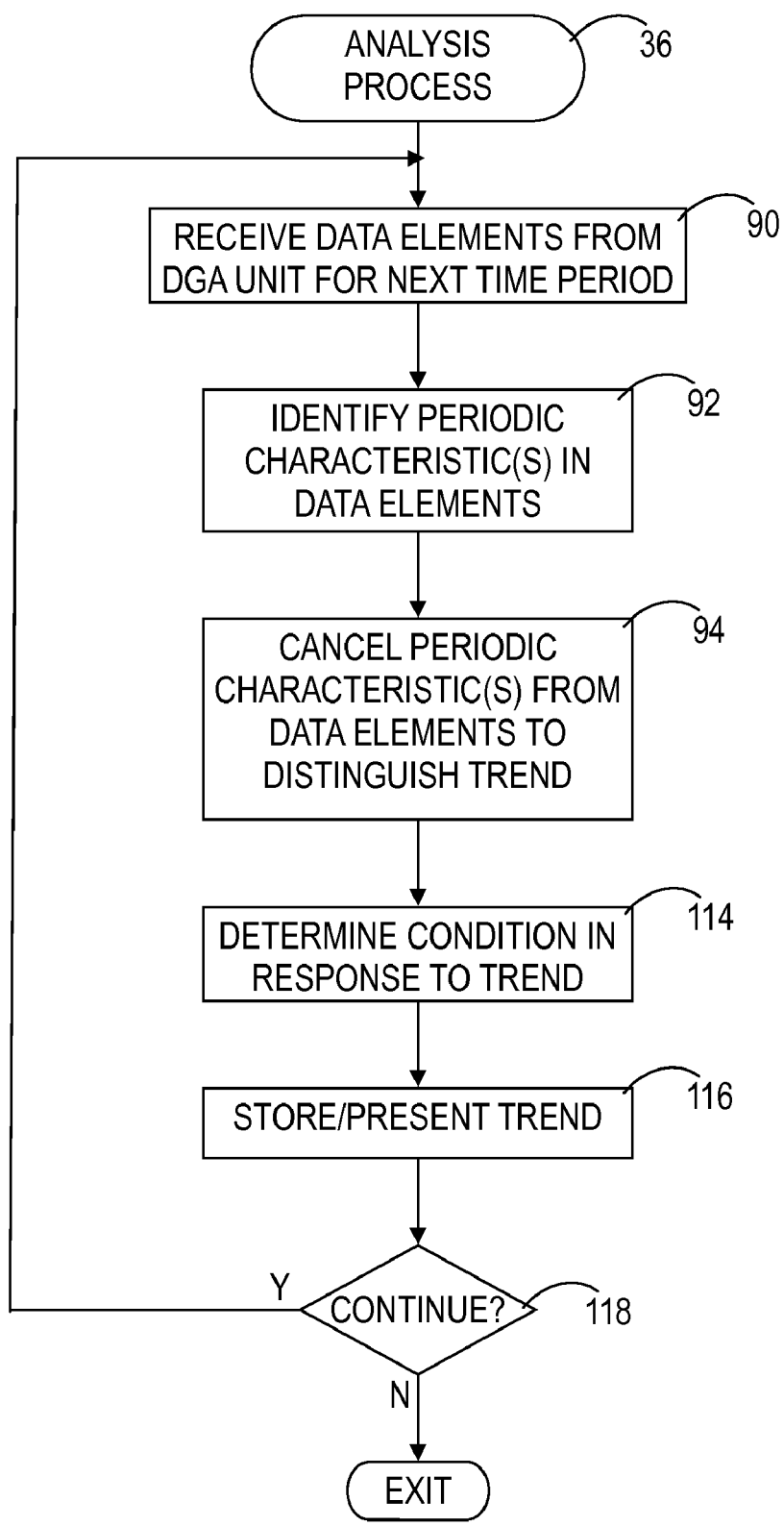
FIG. 5 shows a flowchart of an analysis process in accordance with the present invention.

FIG. 5 shows a flowchart of analysis process 36 in accordance with the present invention. Analysis process 36 is executed by processor 34 (FIG. 1) to obtain results that can be used to determine whether transformers 26 are operating normally, i.e., normal condition 74 (FIG. 2), or abnormally, i.e., abnormal condition 76 (FIG. 3). In particular, analysis process 36 performs harmonic analysis to determine the "steady state" gassing rate of one of transformers 26 (FIG. 1), by eliminating the dramatic fluctuations that can result due to periodic, or cyclic, loading of transformer 26.

Analysis process 36 begins with a task 90. At task 90, processor 34 receives a plurality of data elements 60 that were previously collected from one of DGA units 28 over a desired time period. In one embodiment, one of DGA monitors 28 (FIG. 1) provides data elements 60 containing values 70 (FIG. 2) for a number of gasses 72 (FIG. 2) every four hours, providing two thousand one hundred ninety samples (i.e., values 70 per gas 72) per year. Accordingly, this plurality of values 70 need not be downloaded from one of DGA units 28 at one time, but may alternatively, have been collected periodically and saved in a data file (not shown) in computing system 30 (FIG. 1) for later processing. For purposes of the following discussion data elements 60 pertains to one set of values 70 for one of gases 72 collected over the particular time period. In this exemplary situation, data analysis will involve the determination of a gas generation rate of carbon dioxide gas 72 from data elements 60. However the following discussion applies equivalently to values 70 for any of a number of gases 72 collected as data elements 60 over the particular time period.

Analysis process 36 continues with a task 92. At task 92, periodic characteristics are identified within data elements 60. These periodic characteristics describe the cyclic fluctuation in transformer 26 loading. In one embodiment, analysis process 36 identifies three harmonics. These three harmonics account for the daily, semi-annual, and annual fluctuation typically occurring in transformer loading. For example, daily loads vary due to the changing electricity demands during the day. In addition, transformer load peaking might occur seasonally, i.e., in the summer, but there may additionally be a smaller winter "peak." It should be understood that these common harmonics can be increased, reduced, or adjusted to fit another identified transformer loading pattern. For example, the model may be expanded to include additional harmonics to account for the difference in transformer loading seen during the week versus that seen on the weekend.

A task 94 is performed in connection with task 92. At task 94, these common harmonics, or periodic characteristics, are canceled from data elements 60 (ex., values 72 for carbon dioxide gas 70) to distinguish a trend, such as a steady state gas generation rate.

Referring to FIG. 6 in connection with task 94 of FIG. 5, FIG. 6 shows a table 96 of a sample harmonic regression equation 98 utilized within task 94 of analysis process 36. In the implementation of task 94, harmonic regression analysis is utilized on values 70 to determine the best fit prediction equation, or harmonic regression equation, for values 70. Harmonic regression equation 98 includes a first component 100 as an intercept value, $C_1$, and a second component 102 that is a function of time (e.g., $C_2 t$). Harmonic regression equation 98 further includes a third component 104 to account for a daily transformer loading fluctuation characteristic, a fourth component 106 to account for a semi-annual transformer loading fluctuation characteristic, and a fifth component 108 to account for an annual transformer loading fluctuation characteristic.

In harmonic regression equation 98, second component 102 is shown as having a linear characteristic. However, second component 106 can take other forms, such as $C_2 Ln(t)$, $C_2 e^t$, $C_2 e^{1/t}$, and so forth. Analysis process 36 can substitute second component 102 with one of the other forms, and recalculate a "goodness of fit" or $r^2$ parameter to select the equation with the highest $r^2$ parameter. Of course, a perfect fit of values to a prediction equation, such as harmonic regression equation 98 results in an $r^2$ parameter of one. However, harmonic regression that returns an $r^2$ parameter of between 0.85 and 0.95 is typical.

As mentioned above, transformer loading can effect the gas generation rate and results in sinusoidal characteristics in the observed values 70. When the sinusoidal characteristics are removed, first and second components 102 and 104, respectively, take a y=ax+b form, or a linear equation 110. The "a" value, i.e., $C_2$, is the slope of the line, or a "steady state" gas generation rate 112 of one of transformers 26 (FIG. 1). Should a logarithmic or exponential form of second component 102 be determined to be the "best fit" then the speed at which gas generation rate 112 is accelerating or decelerating can be identified.

Through the harmonic regression analysis at task 94, a trend, i.e., the long-term movement in time series data such as values 70 for one of gases 72, can be distinguished from the periodic characteristics found in data elements. The trend in this example is the gas generation rate 112, and the periodic characteristics in this example include third component 104 accounting for daily fluctuation characteristic, fourth component 106 accounting for a semi-annual fluctuation characteristic, and fifth component 108 accounting for an annual fluctuation characteristic.

Referring back to FIG. 5, following task 94, analysis process 36 continues with a task 114. Task 114 is performed to determine a condition of transformer 26 in response to the trend, or gas generation rate 112. The condition of transformer 26 could be normal condition 74 (FIG. 2) or abnormal condition 76 (FIG. 3). However, by utilizing "steady state" gas generation rate 112, a more accurate and consistent diagnosis of abnormal condition 76 can be determined year round regardless of normal periodic fluctuations in gas generation due to transformer loading.

A task 116 may be performed in connection with task 114. At task 116, trend data, i.e., gas generation rate 112 for one of gases 72 (FIG. 2), may be stored in trend database 50 (FIG. 1) and/or gas generation rate 112 may be presented to a user via, for example, display 50 (FIG. 1). Notification of the results of analysis process 36 may also be conveyed to responsible party 58 (FIG. 1), discussed in connection with FIG. 10.

Following task 116, a query task 118 determines whether analysis process 36 is to continue. Receipt of data elements 60 (FIG. 1) at task 90 may include values 70 (FIG. 2) for a number of gases 72 (FIG. 2). Accordingly, distinguishing a trend from periodic characteristics at task 94, may include identifying gas generation rates for multiple gases 72. Accordingly, analysis process 36 may continue in order to determine these other gas generation rates. In addition, data elements 60 may be available from the same one of transformers 26 for a subsequent period of time. Furthermore, data elements 60 may be available for other transformers 26 (FIG. 1) within facility 20 (FIG. 1) for which analysis is called for. Accordingly, should a user wish to continue analysis at query task 118, process control loops back to task 90 to receive data elements 60 from one of DGA monitors 28 (FIG. 1) associated with a particular one of transformers 26. However, should the user wish to discontinue analysis process 36 at query task 118, analysis process 36 exits.

Figure 7:
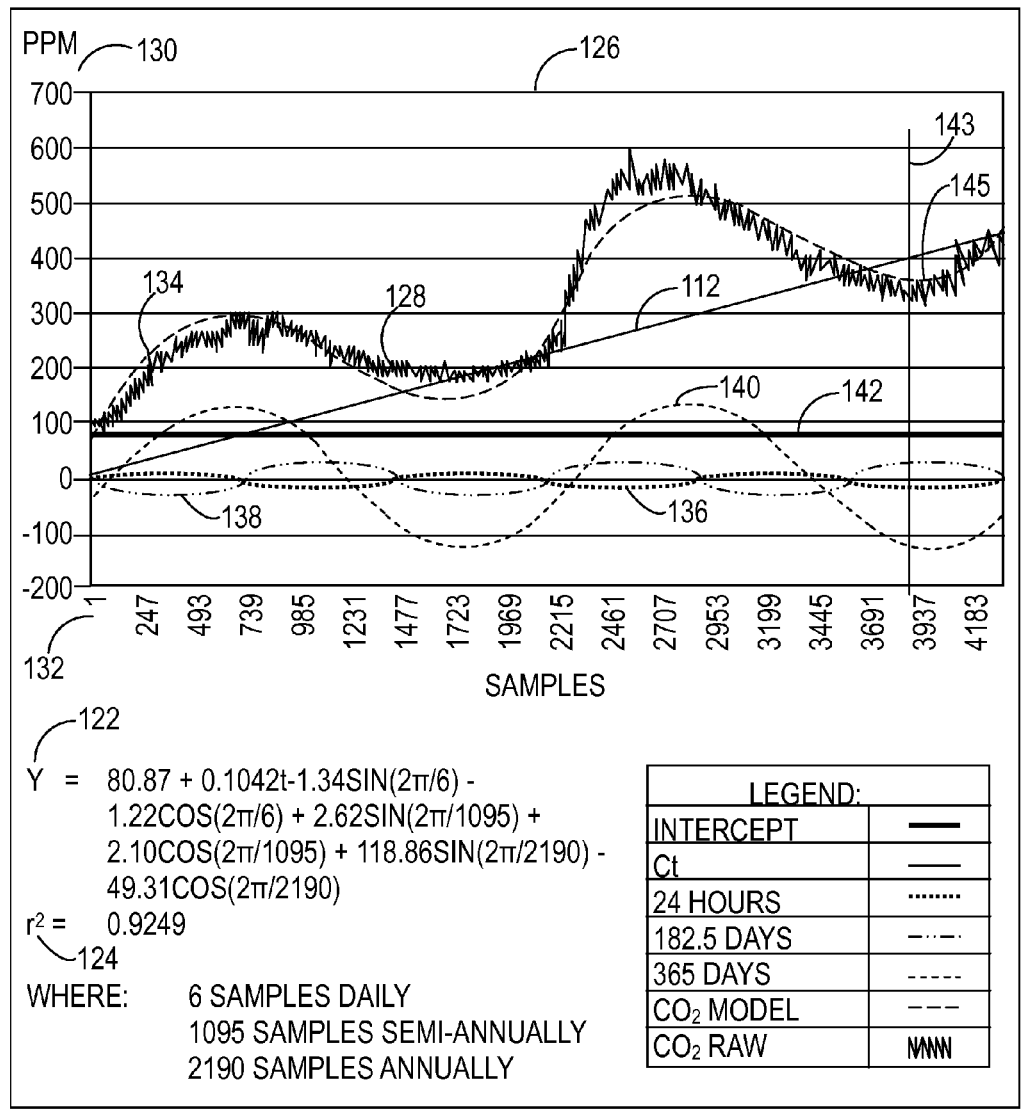
FIG. 7 shows a chart of an exemplary result of a harmonic regression prediction equation that yields a linear fit for the non-harmonic portion of the gas generation rate in response to execution of the analysis process.

FIG. 7 shows a chart 120 of an exemplary result of a harmonic regression prediction equation that yields a linear fit for the non-harmonic portion of a gas generation rate 112 in response to execution of the analysis process 36 (FIG. 5). Chart may be presented to a user via display 50 (FIG. 1) or may be presented to responsible party 58 (FIG. 1) via notification device 56 (FIG. 1). Chart 120 includes a solution 122, where Y equals a predicted carbon dioxide gas value at time, t, to harmonic regression equation 98 (FIG. 6) having a high "goodness of fit" as represented by an r parameter 124. Solution 122 is utilized to identify a trend, i.e., "steady state" gas generation rate 112, for carbon dioxide gas 72 (FIG. 2) in one of transformers 26 (FIG. 1).

Chart 120 includes a graph 126 for visualizing the components of solution 122. Graph 126 includes a first plot 128 of values 130 relative to time 132 of dissolved carbon dioxide gas 72 found in transformer oil and obtained from data elements 60 (FIG. 2). In this embodiment, time 132 coincides with samples. That is, since, transformer oil is sampled every four hours, the numerical value of six samples corresponds to twenty four hours. Commensurately, the numerical value of one thousand ninety-five samples corresponds to one half of a year, and the numerical value of two thousand one hundred ninety samples corresponds to a year.

First plot 128 represents the actual values 70 (FIG. 2) of carbon dioxide gas 72 found in transformer oil over a period of time 132. Graph 126 further includes a second plot 134 that is generated in response to the derived solution 122. Thus, second plot 134 is a "best fit" representation, or model, of the actual values of carbon dioxide modeled using solution 122. For illustrative purposes, graph 126 also includes periodic characteristics of a daily fluctuation 136, a semi-annual fluctuation 138, and an annual fluctuation 140 of transformer loading.

In accordance with the present invention, the sinusoidal components of daily fluctuation 136, semi-annual fluctuation 138, and annual fluctuation 140 are removed, or canceled, from solution 122 so that an accurate trend in the form of "steady state" gas generation rate 112 can be determined. In addition, an intercept value 142 for gas generation can also be ascertained. If gas generation rate 112 is rising too quickly, this information can be relayed to responsible party 58 (FIG. 1) as exception 78 (FIG. 4) specifying an increasing severity level 82 (FIG. 4) of fault condition 80 (FIG. 4).

The harmonic equations of the present invention may additionally be utilized to predict gas values in the future by substituting a future value of "t" into the harmonic equation. FIG. 7 further includes a vertically oriented boundary 143. That portion of second plot 134 located toward the right of boundary 143 represents predicted gas values 145 at a future value of "t." Of course, as the future time "t" occurs, first plot 128, representing actual values 70 (FIG. 2) of carbon dioxide gas 72, may be plotted to verify the accuracy of the prediction. Such predictions can be used to determine when the end-of-life of one of transformers 26 will be reached. For example, predictions may be used to determine cellulose insulating material degradation based on on-line monitoring of carbon monoxide gas 72 and carbon dioxide gas 72, as discussed below.

Transformers 26 (FIG. 1) typically utilize sheets of material made from vegetable cellulose as insulating material. Cellulose is a linear polymer composed of linked glucose units. The number of linked units in the polymer is known as the degree of polymerization. Generally the quality of the cellulose is measured by the average degree of polymerization. The degree of polymerization has been used for many years to determine the condition of power transformer insulating material. A typical insulating material has an average degree of polymerization of approximately one thousand to twelve hundred when new. After extended periods of service, with high concentrations of water and oxygen, and with high temperatures, the paper changes color to dark brown and becomes brittle. This process is known as pyrolysis. Byproducts of pyrolysis include furans, carbon monoxide, and carbon dioxide. When the degree of polymerization has dropped to approximately two hundred, the tensile strength of the insulating material has been reduced to approximately twenty percent of its initial strength. This is considered the end-of-life criterion for transformer insulation.

In operating transformers, in order to directly measure the degree of polymerization, the transformer is deenergized, and samples of the cellulose insulating material are taken to a laboratory for testing. Obviously, this direct measurement methodology is time consuming and expensive. An indirect way to measure the degree of polymerization is through furan testing. Furans are major cellulose degradation products that can be found in the transformer insulating oil. Oil samples can be analyzed for furans and compared with furan models to obtain an approximation of the degree of polymerization of the insulating material. However, this approximation technique does not always give consistent results and it is an added expense to the more valuable dissolved gas analaysis needed to detect fault conditions with transformers 26.

Upcoming models are being developed to predict the relationship between the amount of carbon monoxide and carbon dioxide generated during a transformer's lifetime and the degree of polymerization of the cellulose insulating material. These models can be compared with the predicted gas values, such as predicted gas values 145 of second plot 134, determined through the utilization of the harmonic equations of the present invention to determine when the end-of-life of one of transformers 26 will be reached.

Figure 8:
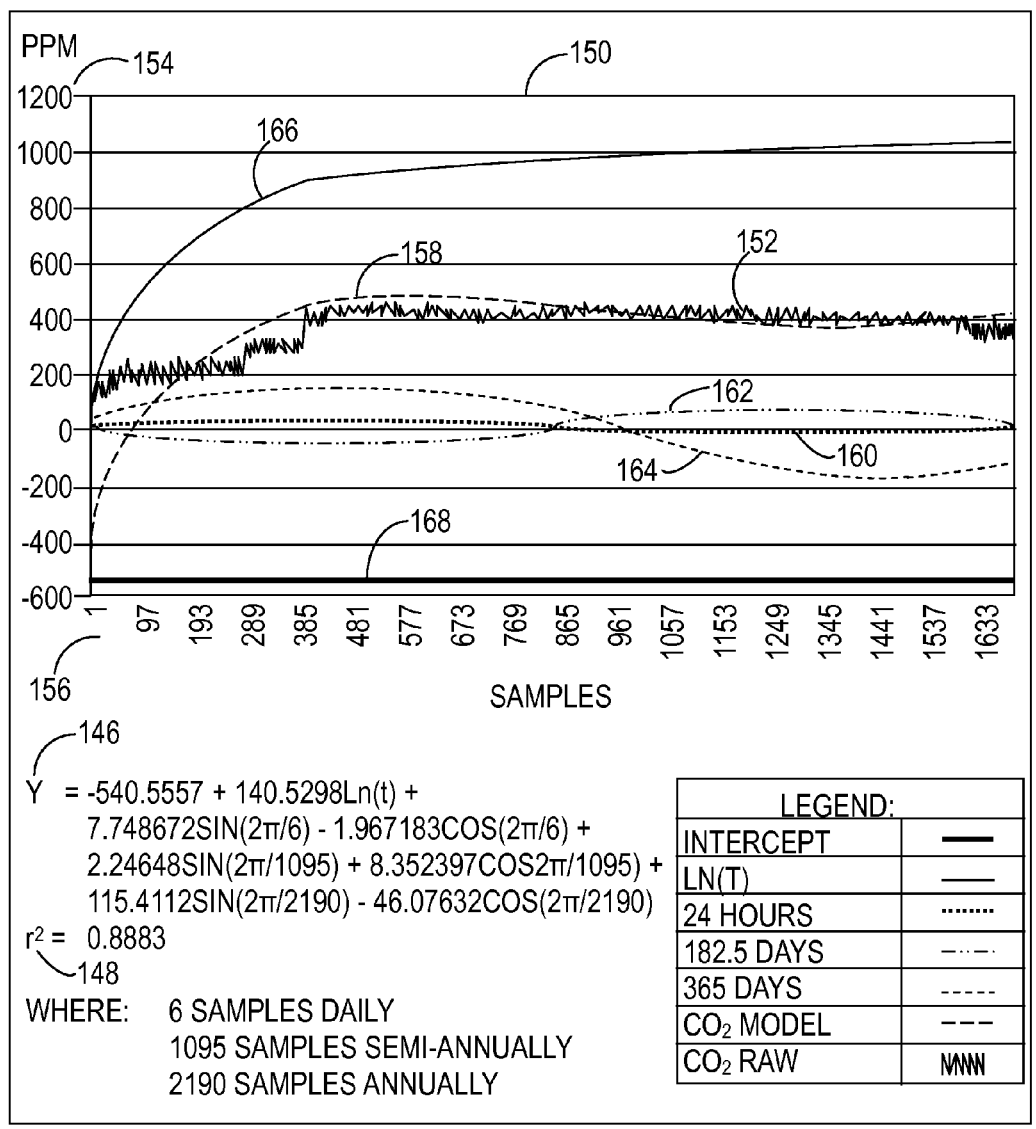
FIG. 8 shows a chart of an exemplary result of a harmonic regression prediction equation that yields a logarithmic fit in response to execution of the analysis process.

FIG. 8 shows a chart 144 of an exemplary result of a harmonic regression prediction equation that yields a logarithmic fit in response to execution of the analysis process 36 (FIG. 5). Chart 144 may be presented to a user via display 50 (FIG. 1) or may be presented to responsible party 58 (FIG. 1) via notification device 56 (FIG. 1). Chart 144 includes a solution 146, where Y equals a predicted carbon dioxide gas value at time, t, to harmonic regression equation 98 (FIG. 6) having a high "goodness of fit" as represented by an $r^2$ parameter 148. In this instance, second component 102 is a logarithmic function, rather than the linear function shown in FIG. 7.

A graph 150 illustrates a first plot 152 representing the actual values 154 of carbon dioxide gas 72 (FIG. 2) found in transformer oil over a period of time 156. Graph 150 also includes a second plot 158 that is generated in response to the derived solution 146. Thus, second plot 158 is a "best fit" representation, or model, of the actual values of carbon dioxide modeled using solution 146. Graph 150 also includes periodic characteristics of a daily fluctuation 160, a semi-annual fluctuation 162, and an annual fluctuation 164 of transformer loading. As shown in graph 150, once the periodic characteristics of daily fluctuation 160, semi-annual fluctuation 162, and annual fluctuation 164 of transformer loading are canceled, a logarithmic curve 166, representing the speed at which the gas generation rate is accelerating or decelerating, and an intercept component 168 are revealed.

The goal of determining the harmonic components, i.e., periodic characteristics, of the various dissolved gases 72 (FIG. 2) in transformer oil was to ultimately remove their effects from the determination of gas generation rates. With the harmonic components canceled from the actual dissolved gas data, the "steady state" gas generation rate 112 (FIG. 7) is revealed. However, this "steady state" rate 112 may not solely be relied on in some situations. That is, the linear equation 110 (FIG. 6) that fits values 70 (FIG. 2) from data elements 60 (FIG. 1) will take a considerable amount of new data at a different gas generation rate to change the linear equation results. In addition, these changes will be dampened, or reduced, by the larger volume of earlier data points. Since conditions in transformer 26 can change rapidly, analysis process 36 should include a component that can sense changes in gassing rates in order to report these changes before failure occurs.

In order to sense changes in gassing rates, piecewise linear approximation may be implemented in analysis process 36 to represent time series data as a series of line segments of various lengths. For dissolved gas analysis, the purpose of this piecewise linear approximation is to determine the starting point and slope of each segment, and whether the slope of the current segment is significantly different from the slope of the previous segment.

As known to those skilled in the art, there are three major approaches to segmenting time series data into a piecewise linear approximation. These approaches include sliding window, top down, and bottom up. A sliding window approach starts at the first data point of the time series to create a segment. The segment "grows" by linking adjacent data points until the segment exceeds some prescribed error. Then, a new segment is begun starting at the next data point. A top down approach divides the time series into segments until a stopping criterion is met. A bottom up approach starts with paired data points and grows longer segments by merging with adjacent segments until some stopping criterion is met. Stopping criteria can take different forms, such as limiting the number of segments, specifying the maximum error of a given segment, or specifying the maximum total error of all the segments. In one embodiment, the bottom up approach produces the most satisfactory results.

Figure 9:
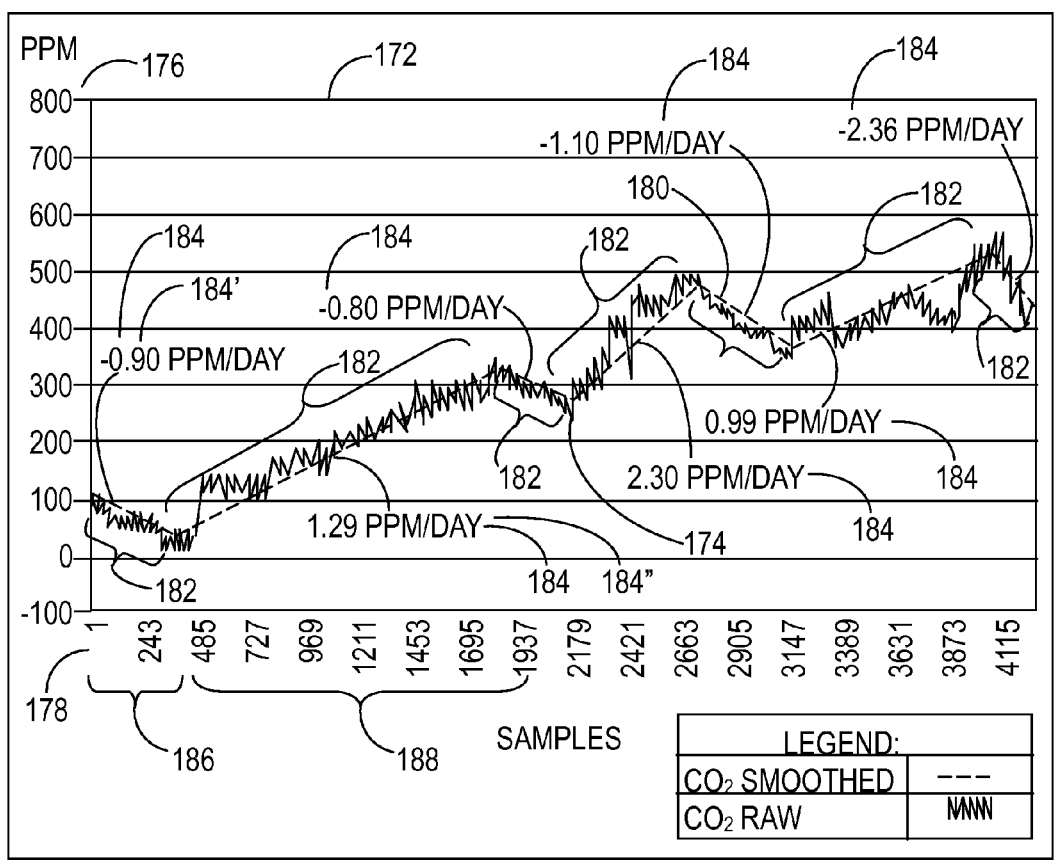
FIG. 9 shows a chart of an exemplary result of a piecewise linear approximation determined in response to execution of the analysis process.

FIG. 9 shows a chart 170 of an exemplary result of a piecewise linear approximation determined in response to execution of analysis process 36. Chart 170 includes a graph 172 illustrating a first plot 174 representing actual values 176 of carbon dioxide gas 72 (FIG. 2) found in transformer oil over a period of time 178. Graph 172 also includes a second plot 180 divided into seven linear segments 182 and derived using piecewise linear approximation. Segments 182 quickly define changes in gas generation rates 184 as compared with a single gas generation rate over the entire sampling interval. For example, a first gas generation rate 184' occurring over a first period of time 186 can be distinguished from a second gas generation rate 184" occurring over a second period of time 188 in order to readily detect changes in a condition of transformer 26 (FIG. 1).

With the periodic characteristics of daily, semi-annual, and annual fluctuations removed, as discussed above, the effects of additional factors on gas generation rate over time can be visualized as the differing segments 182. One exemplary factor may be higher loading for an individual transformer that assumes more load due to facility construction or maintenance. Other factors may include the impact of hotter and/or cooler ambient temperatures than normal. More critically, another factor may be the onset and manifestation of abnormal condition 76 (FIG. 3).

Figure 10:
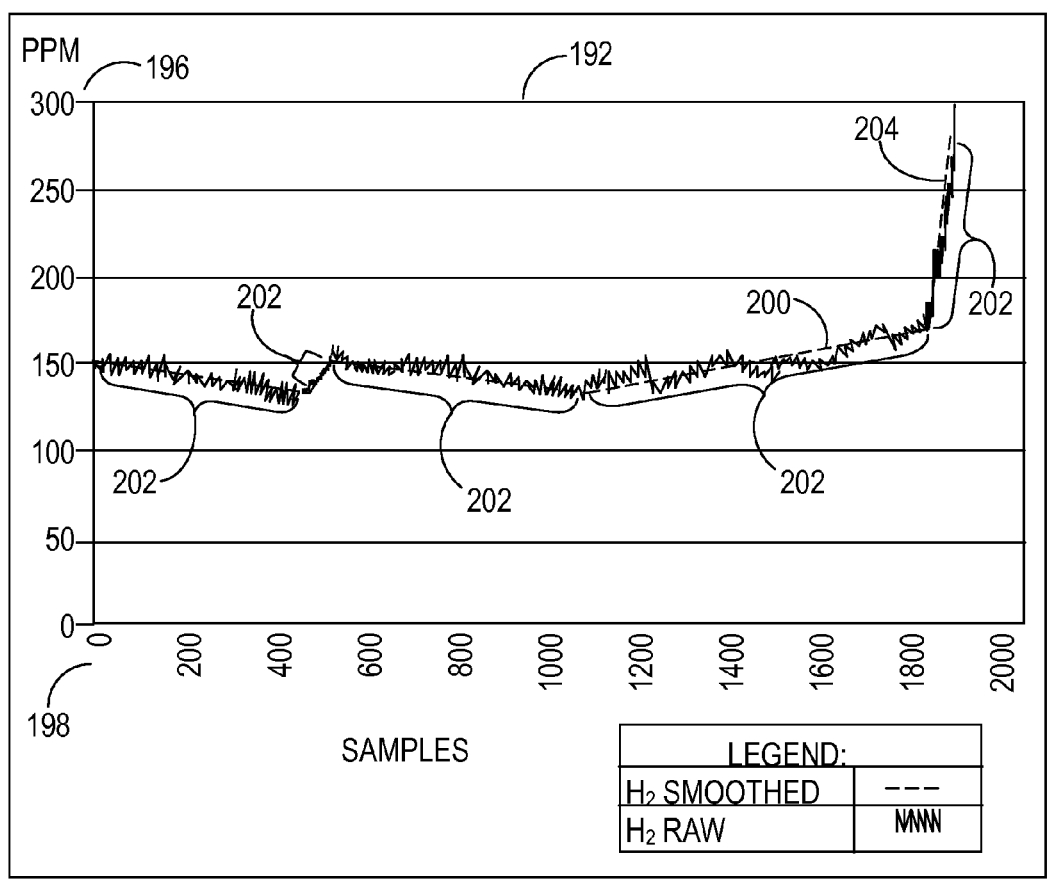
FIG. 10 shows a chart of an exemplary result of another piecewise linear approximation determined in response to execution of analysis process.

FIG. 10 shows a chart 190 of an exemplary result of another piecewise linear approximation determined in response to execution of analysis process 36. Typically, carbon monoxide and carbon dioxide gas generation is cyclic and can be indicative of overheating in transformer 26 (FIG. 1). Thus, in order to determine the "steady state" gas generation rate, the harmonic components of the gas values need only be removed. Other gases, such as acetylene and hydrogen, are generated when active arcing is occurring in transformer 26. Such gasses are sometimes referred to as "hot metal" gases. Arcing is much less affected by cyclic loading. Thus, the data is much more linear.

Chart 190 demonstrates the ability of the piecewise linear approximation methodology to quickly detect changes in the gassing rate of such "hot metal" gases without the need to cancel or remove any potential harmonic components. Chart 190 includes a graph 192 illustrating a first plot 194 representing actual values 196 of hydrogen gas found in transformer oil over a period of time 198. Graph 192 also includes a second plot 200 divided into five linear segments 202 and derived using piecewise linear approximation. Segments 202 quickly define changes in gas generation rates as compared with a single gas generation rate over the entire sampling interval. More critically, graph 192 demonstrates that piecewise segmentation can quickly detect and report dramatic changes in gas generation rates, such as a fifth segment 204. Such a dramatic change may be indicative of a catastrophic problem within transformer 26, such as arcing.

Figure 11:
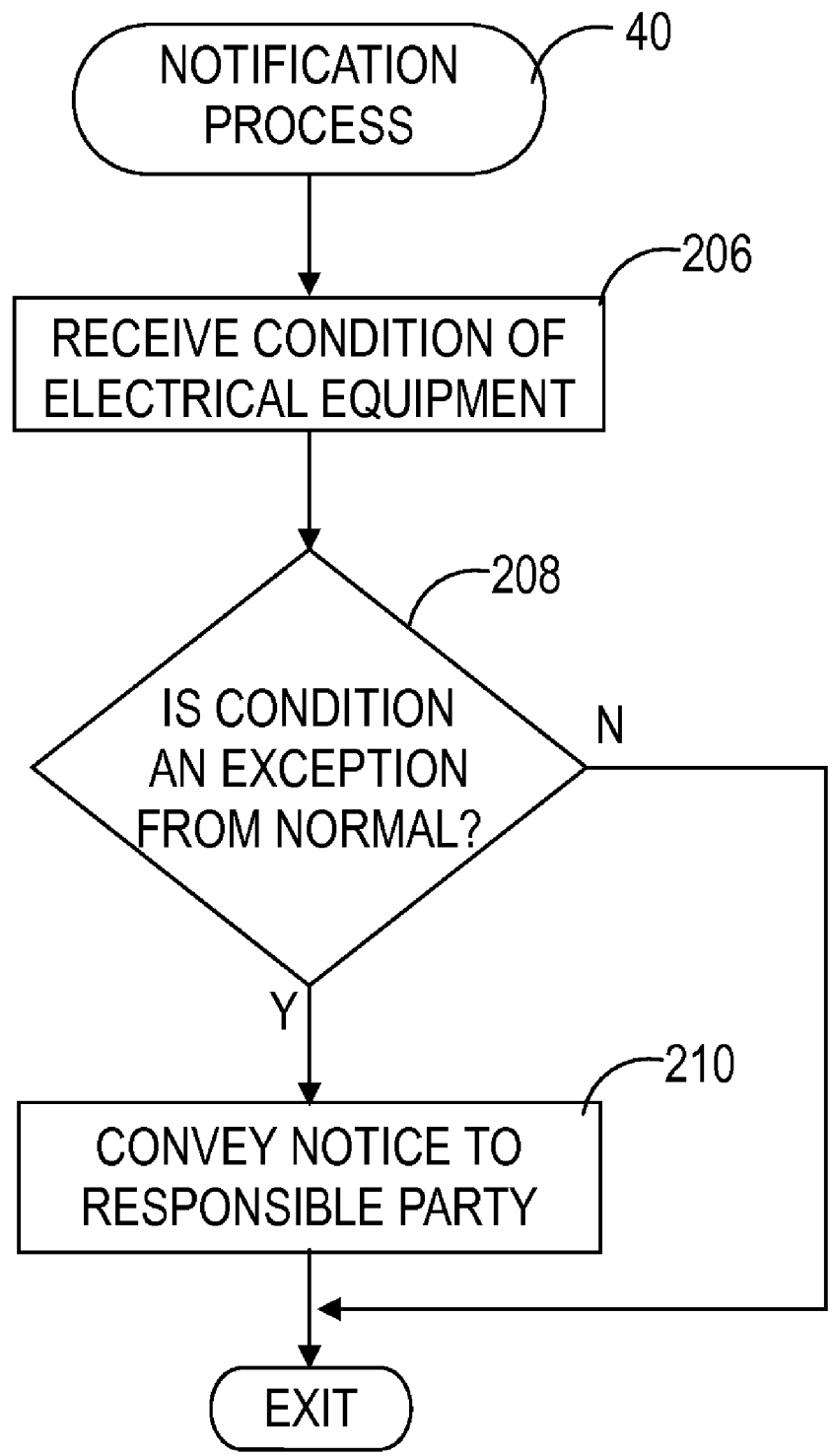
FIG. 11 shows a flowchart of a notification process.

FIG. 11 shows a flowchart of notification process 40. Notification process may be performed to inform one or more responsible parties 58 (FIG. 1) of an abnormal condition at one of transformers 26 (FIG. 1). The notification process presented herein is for illustrative purposes. Those skilled in the art will understand that notification can be performed by a number of methodologies.

Notification process 40 begins with a task 206. At task 206, processor 34 (FIG. 1) receives a condition of one of transformers (FIG. 1). The condition results from execution of analysis process 36, and may include one of normal condition 74 or abnormal condition 76, and/or trend data 88 (FIG. 4).

Next, a query task 208 determines whether the condition is an exception from a normal condition. When the condition is abnormal, or indicates that a fault has been detected in one of transformers 26 through dissolved gas analysis, process control continues with a task 210.

At task 210, notice 62 (FIG. 4) is conveyed to responsible party 58 (FIG. 1). However, when query task 208 determines that there are no abnormalities to report, notification process 40 exits.

In summary, the present invention teaches of a method, executable code, and a system for analyzing a condition of electrical equipment monitored by a monitoring device and presenting those results to a user. The present invention utilizes a harmonic regression method to provide an accurate determination of actual gas generation rate in a power transformer. It does so through the elimination of the harmonic effects, or periodic characteristics, that transformer loading has on gas generation rates. As such the true, "steady state" gas generation rate can be determined after the harmonic components, which act like noise, are factored out. In addition, present invention can yield accurate predictions of future gas generation rates in order to determine, for example, when the end-of-life for a power transformer will be reached.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for analyzing a condition of electrical equipment monitored by a monitoring device comprising:
   receiving data elements collected at said monitoring device that characterize behavior of said electrical equipment during operation of said electrical equipment over a period of time, said data elements being received at a processing system from said monitoring device;
   identifying a periodic characteristic within said data elements responsive to said operation of said electrical equipment;
   distinguishing a trend from said periodic characteristic, said data elements being transformed to said trend by canceling said periodic characteristic from said data elements to reveal said trend;
   determining said condition of said electrical equipment in response to said trend; and
   presenting said condition to a user.

2. A method as claimed in claim 1 wherein said periodic characteristic is a daily fluctuation in loading of said electrical equipment.

3. A method as claimed in claim 1 wherein said periodic characteristic is a semi-annual fluctuation in loading of said electrical equipment.

4. A method as claimed in claim 1 wherein said periodic characteristic is an annual fluctuation in loading of said electrical equipment.

5. A method as claimed in claim 1 wherein:
   said identifying operation identifies multiple periodic characteristics, each of said multiple periodic characteristics describing a discrete periodic fluctuation in loading of said electrical equipment, said periodic characteristic being one of said multiple periodic characteristics; and
   said distinguishing operation distinguishes said trend from each of said multiple periodic characteristics.

6. A method as claimed in claim 1 wherein said canceling operation reveals said trend as a substantially linear representation of said condition of said electrical equipment.

7. A method as claimed in claim 1 wherein said electrical equipment is a transformer maintained by a utility company, said monitoring device is a dissolved gas monitoring unit, said data elements are current values of a dissolved gas in transformer oil of said transformer, and said method further comprises performing said receiving, identifying, distinguishing, determining, and presenting operations at said processing system for said utility company.

8. A method as claimed in claim 1 wherein said electrical equipment is a transformer maintained by a utility company, said monitoring device is a dissolved gas monitoring unit, said data elements are current values of a dissolved gas in a volume of transformer oil in said transformer, and said determining operation determines a gas generation rate from said trend, said gas generation rate identifying said condition of said transformer.

9. A method as claimed in claim 1 further comprising predicting from said trend a future condition of said electrical equipment at a future time that follows said period of time.

10. A method as claimed in claim 1 wherein said period of time is a first period of time, said trend is a first trend, and said method further comprises:
receiving second data elements over a second period of time at said processing system from said monitoring device;
distinguishing a second trend from said periodic characteristic, said second trend differing from said first trend;
determining a change in said condition of said electrical equipment from said second trend; and
presenting said change in said condition to said user.

11. A method as claimed in claim 1 wherein:
said determining operation includes ascertaining from said trend that said condition defines an exception to a normal condition of said electrical equipment; and
said presenting operation includes conveying a notice of said condition to said user at an instance of said exception.

12. A computer-readable storage medium containing executable code for instructing a processor to analyze a condition of a transformer maintained by an organization and monitored by a dissolved gas monitoring device, said executable code instructing said processor to perform operations comprising:
receiving, from said monitoring device, data elements associated with operation of said transformer during a period of time, said data elements including current values of a dissolved gas in a volume of transformer oil in said transformer;
identifying, from said data elements, a periodic characteristic responsive to said operation of said transformer;
distinguishing a trend from said periodic characteristic by canceling said periodic characteristic from said data elements over said period of time to reveal said trend;
determining a gas generation rate of said dissolved gas from said trend, said gas generation rate identifying a condition of said transformer; and
presenting said condition to a user.

13. A computer-readable storage medium as claimed in claim 12 wherein said executable code instructs said processor to perform further operations comprising:
identifying multiple periodic characteristics, each of said multiple periodic characteristics describing a discrete periodic fluctuation in loading of said transformer, said periodic characteristic being one of said multiple periodic characteristics; and
said distinguishing operation distinguishes said trend from each of said multiple periodic characteristics.

14. A computer-readable storage medium as claimed in claim 13 wherein said multiple periodic characteristics include a daily fluctuation, a semi-annual fluctuation, and an annual fluctuation.

15. A computer-readable storage medium as claimed in claim 12 wherein said executable code instructs said processor to perform a further operation comprising predicting from said trend a future condition of said transformer at a future time that follows said period of time.

16. A computer-readable storage medium as claimed in claim 12 wherein said executable code instructs said processor to perform further operations comprising:
ascertaining from said trend that said condition defines an exception to a normal condition of said transformer; and
conveying a notice of said condition to said user at an instance of said exception.

17. A computing system for analyzing a condition of electrical equipment monitored by a monitoring device comprising:
a processor;
an input element, in communication with said processor, for receiving data elements from said monitoring device, said data elements being associated with operation of said electrical equipment during a period of time;
a computer-readable storage medium; and
executable code recorded on said computer-readable storage medium for instructing said processor to perform operations comprising:
identifying, from said data elements, multiple periodic characteristics responsive to said operation of said electrical equipment, each of said multiple periodic characteristics describing a discrete periodic fluctuation in loading of said electrical equipment;
distinguishing a trend from said periodic characteristics by canceling said multiple periodic characteristics from said data elements over said period of time to reveal said trend; and
determining said condition of said electrical equipment in response to said trend; and
an output element in communication with said processor for presenting said condition to a user.

18. A computing system as claimed in claim 17 wherein said executable code instructs said processor to perform a further operation comprising predicting from said trend a future condition of said electrical equipment at a future time that follows said period of time.

19. A computing system as claimed in claim 17 wherein said period of time is a first period of time, said trend is a first trend, and said executable code instructs said processor to perform further operations comprising:
receiving second data elements over a second period of time from said monitoring device;
distinguishing a second trend from said multiple periodic characteristics, said second trend differing from said first trend;
determining a change in said condition of said electrical equipment from said second trend; and
presenting said change in said condition to said user.

* * * * *